United States Patent
Nag et al.

(10) Patent No.: US 11,615,361 B2
(45) Date of Patent: Mar. 28, 2023

(54) MACHINE LEARNING MODEL FOR PREDICTING LITIGATION RISK IN CORRESPONDENCE AND IDENTIFYING SEVERITY LEVELS

(71) Applicant: ORACLE INTERNATIONAL CORPORATION, Redwood Shores, CA (US)

(72) Inventors: Ria Nag, Kolkata (IN); Padmakumar Nambiar, Bangalore (IN); Karthik Venkatasubramanian, Melbourne (AU); Suvendu Praharaj, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 62 days.

(21) Appl. No.: 17/307,163

(22) Filed: May 4, 2021

(65) Prior Publication Data
US 2021/0256436 A1    Aug. 19, 2021

Related U.S. Application Data

(63) Continuation-in-part of application No. 17/018,297, filed on Sep. 11, 2020, now Pat. No. 11,481,734.
(Continued)

(51) Int. Cl.
*G06Q 10/06* (2012.01)
*G06Q 10/10* (2012.01)
(Continued)

(52) U.S. Cl.
CPC ..... *G06Q 10/0635* (2013.01); *G06F 16/3334* (2019.01); *G06F 40/30* (2020.01); *G06N 20/20* (2019.01); *G06Q 10/10* (2013.01)

(58) Field of Classification Search
CPC .... G06Q 10/0635; G06Q 10/10; G06N 20/20; G06F 16/3334; G06F 40/30
See application file for complete search history.

(56) References Cited

U.S. PATENT DOCUMENTS 8,620,842 B1   12/2013   Cormack
9,552,548 B1*  1/2017   Brestoff ............ G06Q 10/0635
(Continued)

OTHER PUBLICATIONS

Gupta, Narendra, Mazin Gilvert, and Guiseppe Di Fabbrizio, "Emotion Detection in Email Customer Care", Association for Computational Linguistics, Proceedings of the Naacl Hlt 2010 Workshop on Computational Approaches to Analysis and Generation of Emotion in Text, pp. 10-16, Jun. 2010. (Year: 2010).*
(Continued)

*Primary Examiner* — Nam T Tran
(74) *Attorney, Agent, or Firm* — Kraguljac Law Group, LLC

(57) ABSTRACT

Systems, methods, and other embodiments associated with detecting severity levels of risk in an electronic correspondence are described. In one embodiment, a method includes inputting, into a memory, a target electronic correspondence that has been classified as being litigious by a machine learning classifier. An artificial intelligence rule-based technique is applied to the target electronic correspondence that identifies high and medium risk level keywords. The technique is also configured to generate a litigious score based on a sum of term frequencies-inverse document frequencies using the remaining keywords. An electronic notice is transmitted to a remote computer over a communication network that identifies the target electronic correspondence and the level of litigation risk.

20 Claims, 9 Drawing Sheets

Related U.S. Application Data

(60) Provisional application No. 62/900,086, filed on Sep. 13, 2019.

(51) Int. Cl.
    *G06N 20/20*        (2019.01)
    *G06F 16/33*        (2019.01)
    *G06F 40/30*        (2020.01)
    *G06Q 10/0635*    (2023.01)

(56) References Cited

U.S. PATENT DOCUMENTS

| | | |
|---|---|---|
| 9,760,850 B1 | 9/2017 | Brestoff |
| 10,095,992 B1 | 10/2018 | Brestoff et al. |
| 10,484,429 B1 * | 11/2019 | Fawcett .................. H04L 63/20 |
| 10,685,310 B1 * | 6/2020 | McCuiston ........ G06Q 10/0635 |
| 2004/0205661 A1 * | 10/2004 | Gallemore ............ G06F 40/253 707/999.006 |
| 2005/0209897 A1 * | 9/2005 | Luhr ................... G06Q 10/0635 705/7.29 |
| 2013/0036478 A1 * | 2/2013 | Davis .................... G06Q 10/107 726/28 |
| 2014/0337269 A1 | 11/2014 | Eads |
| 2015/0195406 A1 * | 7/2015 | Dwyer ..................... G06F 40/30 379/265.07 |
| 2016/0321582 A1 * | 11/2016 | Broudou ............ G06Q 10/0635 |
| 2018/0144421 A1 | 5/2018 | Williams et al. |
| 2019/0019061 A1 | 1/2019 | Trenholm et al. |
| 2019/0213498 A1 | 7/2019 | Adjaoute |
| 2020/0074242 A1 | 3/2020 | Chen et al. |

OTHER PUBLICATIONS

Tixier et al., Application of Machine Learning to Construction Injury Prediction; pp. 1-27; Jun. 2016, www.sciencedirect.com.

1st Non-Final Office Action from U.S. Appl. No. 17/018,297, filed Sep. 11, 2020, dated Nov. 24, 2021, 20 pgs.

Kakhki et al., Evaluating Machine Learning Performance in Predicting Injury Severity in Agribusiness Industries; ScienceDirect; Safety Science 117 (2019) pp. 257-262; downloaded on Oct. 21, 2021 from: https://www.sciencedirect.com/science/article/pii/S092575351831107X.

Python Software Foundation; Python Framework for Fast Vector Space Modelling; gensim 4.1.2—pip install gensim; pp. 1-4; released Sep. 16, 2021.

Scikit-Learn Developers (BSD License); sklearn.linear_model.LogisticRegressionCV; pp. 1-6; 2207-2021; downloaded on Oct. 21, 2021 from: https://scikit-learn.org/stable/modules/generated/sklearn.linear_model.LogisticRegressionCV.html.

Tianqi Chen et al., Package 'xgboost';—Title: Extreme Gradient Boosting; version 1.4.1.1; Apr. 22, 2021; pp. 1-65; downloaded Oct. 21, 2021 from: https://cran.r-project.org/web/packages/xgboost/xgboost.pdf.

Akinosho et al.; Deep Learning in the Construction Industry; A review of Present Status and Future Innovations; Journal of Building Engineering, vol. 32; Nov. 2020, 101827; pp. 1-14; downloaded on Oct. 21, 2021 from: https://www.sciencedirect.com/science/article/pii/S2352710220334604#bib54.

Zhang et al.; A C-BiLSTM Approach to Classify Construction Accident Reports; pp. 1-16; published Aug. 20, 2020; Licensee MDPI, Basel, Switzerland; downloaded on Oct. 21, 2021 from: https://www.mdpi.com/2076-3417/10/17/5754/pdf.

Alozn et al; Can Machines Replace the Human Brain? A Review of Litigation Outcome Prediction Methods for Construction Disputes; pp. 1-8; Construction Law Intl. Conference, Mar. 2015.

Ullman; Stanford; Data Mining (Chapter 1) pp. 1-19; downloaded from: http://i.stanford.edu/~ullman/mmds/ch1.pdf.

Stacy Sinclair; Fenwick Elliott; AI and Contruction Law: an Essential and Inevitable Partnership; Part 2: Dispute Resolution and Predicting Dispute Outcomes; pp. 2-4; downloaded from: https://www.fenwickelliott.com/research-insight/newsletters/international-quarterly/ai-construction-law-2.

Dmitriy Selivanov; Package 'text2vec', Modern Text Mining Framework for R; Feb. 18, 2020; pp. 1-11.

Arditi et al., Predicting the Outcome of Construction Litigation Using Boosted Decision Trees; Journal of Computing in Civil Engineering / vol. 19, Issue 4—Oct. 2005, pp. 1-7.

Mahfouz et al., Litigation Outcome Prediction of Differing Site Condition Disputes Through Machine Learning Models; Journal of Computing in Civil Engineering / vol. 26, Issue 3, May 2012; pp. 1-11.

Patent Cooperation Treaty (PCT), International Search Report and Written Opinion issued in PCT International Application No. PCT/US2022/043570, (International Filing Date: Sep. 15, 2022) dated Dec. 2, 2022 (16 pgs).

\* cited by examiner

| Corresp. ID | Correspondence Data | Feature 1 | Feature 2 | Feature 3 | Feature 4 |
|---|---|---|---|---|---|
| 153724283 | Hi *** I visited this claim last month with the owner. The area in dispute is an area of 69 sqm in front of the garage and has cracked to the extent that it needs to be replaced. This I consider to be the fault of the contractor not putting in the Correct amount of cuts. We have received contact from the customers legal representative regarding the repairs that were completed to their driveway at *, **.The customer had repairs carried out by * but due to substandard work the driveway had to be replaced again.** | -0.0155624 | -0.0155624 | -0.0561929 | -0.0155624 |

FIG. 2

| correspondence_id | Correspondence text |
|---|---|
| | \*\*\*, |
| | Our legals have confirmed that; we may be ;potentially in breach by not supplying the names of all operatives to \*\*\*. |
| | They have written to \*\*\* to confirm that this will commence immediately. |
| | Get \*\*\* to filter our master list used internally daily to suit. |
| | 2. The individual daily work sheets that are gathered on site for issue to \*\*\* need filtering. \*\*\* want's you to read the sheets and redline any that are incorrect before they leave site. |
| 269327673 | Regards |

Keywords in Text: breach, issue, suit

TF-IDF Sum of litigious words: 0.404248

Machine Label: Low severity

FIG. 7

MACHINE LEARNING MODEL FOR PREDICTING LITIGATION RISK IN CORRESPONDENCE AND IDENTIFYING SEVERITY LEVELS

CROSS REFERENCE TO RELATED APPLICATIONS

This disclosure claims priority to U.S. patent application Ser. No. 17/018,297 filed on Sep. 11, 2020, titled "Machine Learning Model for Predicting Litigation Risk on Construction and Engineering Projects," which claims the benefit of U.S. Provisional Patent Application serial number "62/900,086" filed Sep. 13, 2019, titled "Transforming Construction and Engineering Systems With Technology and Data Insights," both assigned to the present assignee and both priority applications are incorporated by reference herein in their entirety.

BACKGROUND

Disputes and litigations are a common occurrence in most large-scale construction and engineering projects. These disputes and litigations cost owners, contractors, sub-contractors, architects, and consultants millions of dollars in damages impacting the overall project. Early detection of potential issues that could lead to disputes and litigations enable proactive interventions.

For example, digital platforms are used to manage and communicate day-to-day electronic correspondences over the course of a project. These electronic correspondences contain information that if deciphered correctly could indicate early signs of potential issues that could lead to larger disputes or litigations. These early signs can be used to identify dispute and litigation risks associated with each project and can serve to provide early warnings.

However, no prior system exists that is a computer intelligent system for identifying such early signs or risks for a project. Also, there is no prior system that can forecast or predict a potential risk for a project based on electronic correspondence.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 2 illustrates one embodiment of a document term matrix in R for a single correspondence thread with 4 features.

FIG. 7 illustrates one example of a correspondence text and labeled severity level.

DETAILED DESCRIPTION

Figure 1:
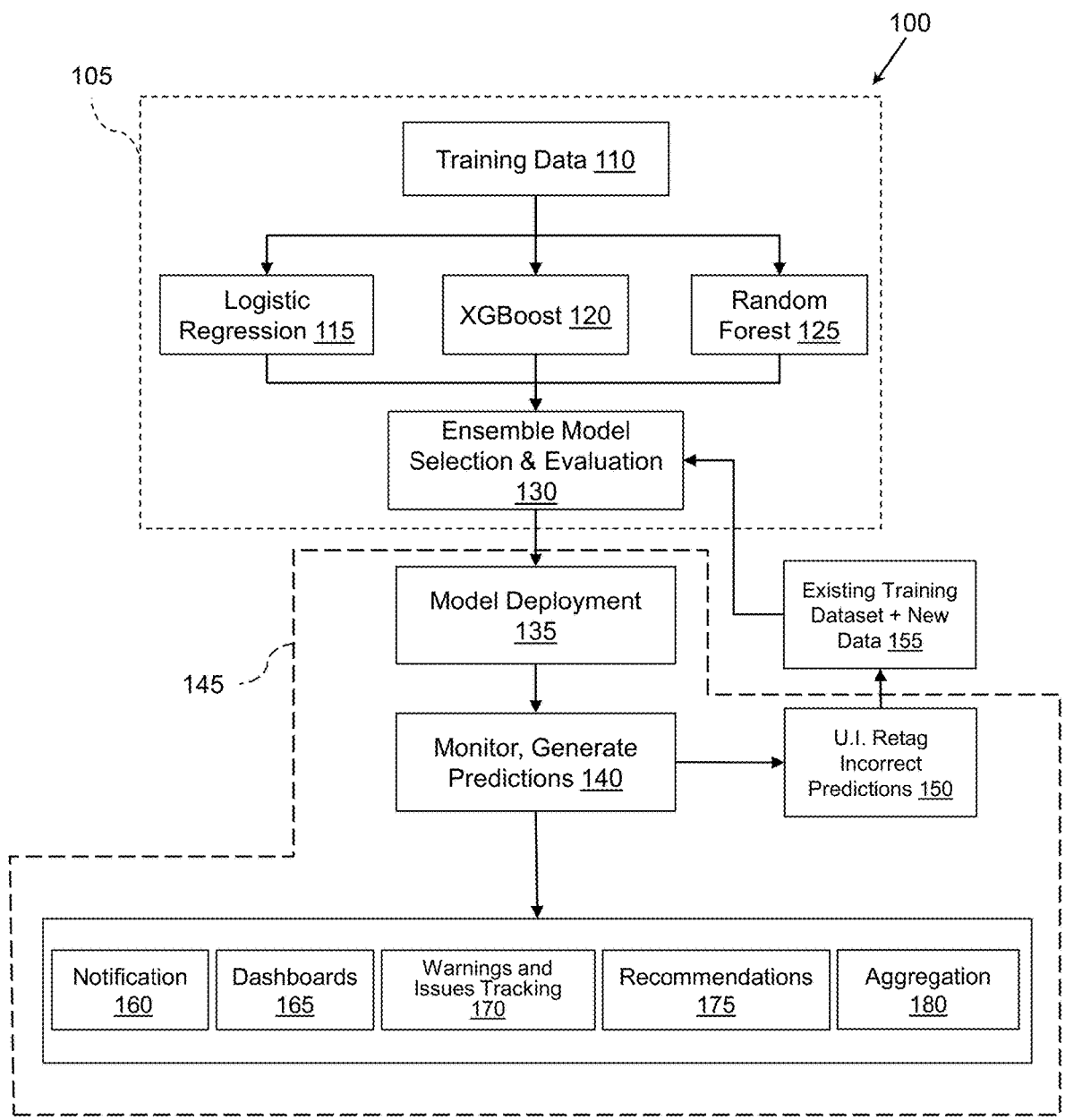
FIG. 1 illustrates one embodiment of a machine learning system associated with predicting risk from electronic correspondence.

Systems and methods are described herein that implement an artificial intelligence (AI) based monitoring and detection system. In one embodiment, a machine learning model is configured to monitor network communications and predict litigation risk in electronic correspondences exchanged that relate to construction and engineering projects. For example, the system and method identifies litigation risks using an application-specific artificial intelligence configured for semantic natural language understanding, created, trained and optimized specifically for litigation issue detection in text from construction and engineering project correspondence.

In one embodiment, the present system monitors (e.g., in near real-time) network communications and electronic correspondence in an ongoing project or a collection of projects in an organization's portfolio. Information in the electronic correspondence is deciphered with the machine learning model to identify and detect language indicating risk of litigation. The machine learning model makes a prediction whether the language amounts to a threshold level of risk based on at least a set of trained data. When the risk is predicted for a correspondence, the system automatically generates an alert in near-real time and labels the associated correspondence threads as litigious. This may include labeling an email thread if there is a litigation risk associated with the last correspondence sent in a single thread.

In one embodiment, the system may combine the identified correspondence with contextual project metadata to associate the predicted risk with a project process. Information about the identified correspondence and the identified project may then be transmitted and/or presented on a graphical user interface and/or transmitted in an electronic message to a remote computer for a user to have access to the information in near real-time. In another embodiment, the present system provides a feed-back process where the user can change the labels associated with a selected communication thread in case the prediction by the system is incorrect as judged based on the user's experience and intuition. The changed label is then fed back to the present system model as new training data to improve the prediction accuracy over time.

In another embodiment, the system may further include a severity detection system. After an electronic correspondence has been identified and/or labeled as being potentially litigious, the severity detection system determines a severity level of risk. For example, the severity detection system applies an AI rules-based algorithm to the text of the electronic correspondence, which then judges whether the text represents a high level, a medium level, or a low level of severity risk for litigation. The severity detection system is discussed with reference to FIG. 5.

In general, an electronic correspondence or communication as used herein may include different forms of communications but not limited to an email message, a group of email messages, an email thread, one or more text messages, social media posts, chat room messages, a transcribed voice message, instant messages, or other messages that contain text capable of being analyzed by a computer in electronic form.

With reference to FIG. 1, one embodiment of a risk detection system 100 is illustrated that is configured to monitor network communications and predict litigation risk in electronic correspondences. Initially, the system 100 includes training a machine learning model (described below) with a known dataset of project correspondence including known litigious language and known non-litigious language. The training configures the machine learning model to identify and predict legal risks associated with a particular project based on electronic correspondence that is monitored. In one embodiment, after the model is deployed and operating to monitor communications, any identified legal risks are categorized based on a likelihood the identified risk will result in a dispute or a litigation. The identified risks and associated correspondence may be presented and displayed for validation to allow correction of any incorrect predictions. Any corrected predictions are then fed back into the machine learning model to learn from the corrected predictions. This allows the system to evolve over time to identify legal risks specific to a particular construction project. A more detailed explanation follows.

Training Phase

With reference to FIG. 1, components of an initial training phase are shown within the dashed line 105. In one embodiment, training data 110 is input to the machine learning model, which includes multiple, independently operating, base machine learning classifiers/algorithms. Each classifier generates an output that classifies a correspondence being evaluated and all the outputs are combined to create an ensemble majority voting classifier 130.

In FIG. 1, the risk detection system 100 includes an odd number (three) base machine learning classifiers/algorithms 115, 120, and 125. In one embodiment, each base classifier is selected based on operating from a different theoretical background from the other classifiers to avoid bias and redundancy. For example, the three classifiers shown include (1) a logistic regression classifier 115 with L1 regularization, which is a parametric classifier; (2) a gradient boosting classifier XGBoost 120, which uses the Gradient Boosting framework; (3) a random forest classifier 125, which is an ensemble learning method that operates by constructing a multitude of decision trees and implements machine learning algorithms under the bootstrap aggregation framework.

The training data 110 is input to each of the machine learning classifiers 115, 120, and 125. For example, the training data includes a known dataset of construction project correspondence including known litigious language and known non-litigious language.

Structure of the Classification Problem

It is observed a number of observation's pairs $(x_i, y_i)$ i=1, ..., n where $x \in X \subset \mathbb{R}^p$ and $y \in Y = \{$Litigious correspondence, not litigious correspondences$\}$. X is a predictor space (or attributes) and Y is a response space (or class).

In this case, the number of attributes is the features of the vectors obtained upon vectorization of each correspondence thread text. In one embodiment, a pre-trained vectorization model uses text2vec library for text vectorization, topic modeling, word embeddings, and similarities. The first step is to vectorize text using vocabulary based vectorization. Here unique terms are collected from a group of input documents (e.g., groups of email correspondence and threads) and each term is marked with a unique ID. Then the risk detection system 100 creates a vocabulary based document term matrix (DTM) using the pre-trained vectorization model in text2vec. This process transforms each correspondence thread into a numerical representation in the vector space. This process transforms text into a numerical representation (an embedding) of the text's semantic meaning. If two words or documents have a similar embedding, they are semantically similar. Thus using the numerical representation, the risk detection system 100 is capable of capturing the context of a word in a document, semantic and syntactic similarity, relation with other words, etc.

The entire dataset is transformed into an m×n matrix with m being the number of correspondence threads and n is the total number of features in the vector space. Each correspondence thread is represented by a vector of n dimensions: Table 1—Document Term Matrix:

TABLE 1

| | T1 | T2 | T3 | T4 | T5 | T6 | T7 | T8 |
|---|---|---|---|---|---|---|---|---|
| Doc1 | 2 | 0 | 4 | 3 | 0 | 1 | 0 | 2 |
| Doc2 | 0 | 2 | 4 | 0 | 2 | 3 | 0 | 0 |
| Doc3 | 4 | 0 | 1 | 3 | 0 | 1 | 0 | 1 |
| Doc4 | 0 | 1 | 0 | 2 | 0 | 0 | 1 | 0 |
| Doc5 | 0 | 0 | 2 | 0 | 0 | 4 | 0 | 0 |
| Doc6 | 1 | 1 | 0 | 2 | 0 | 1 | 1 | 3 |
| Doc7 | 2 | 1 | 3 | 4 | 0 | 2 | 0 | 2 |

Document Term Matrix

With reference to FIG. 2, an example of a document term matrix in R for a single correspondence thread with four (4) features is shown. A correspondence ID 205 is assigned to each particular correspondence thread (data 210). The four (4) example features are listed as Feature 1; Feature 2; Feature 3; and Feature 4. Here each feature in vector space is a feature from the correspondence generated by the pre-trained vectorization model. The generic terms "Feature 1," "Feature 2," etc. are used for simplicity and for discussion purposes only. The labels for each of these features (e.g., "yxnhwauaggd", "neapbbuzu") as shown in FIG. 2 are also generated by the model and do not have any physical significance in this discussion. The labels can instead be represented as other types of strings based on how the model is configured to generate such labels.

The objective is to use these observations in order to estimate the relationship between X and Y, thus predict X from Y. The relationship is denoted as a classification rule, $$h_j(X) = \arg\max P(y|X, \theta_j), j=1, \ldots, 3 \quad \text{(Equation 1)}$$

where P(.,.) is the probability distribution of the observed pairs, Θ is the parameter vector for each base classifier, and j is the number of the base classifiers. Since the risk detection system 100 implementation has three base classifiers 115, 120, and 125, there are three classification rules, one for each base classifier, hence j=3.

In FIG. 2, under the columns of Features 1-4, numbers −0.0155624, −0.0561929, etc. are shown. These numbers represent example values of each feature in a document vector (vectorized representation of each document).

Data Preparation

A labeled dataset of about 1,129 unique records of correspondence threads was created with about 550 sample correspondences having known litigious text and about 583 sample correspondences having known non-litigious correspondences. Of course, different amounts of data records may be used. In addition to having known litigious text and known non-litigious text, the correspondence from the dataset may include known construction and/or engineering vocabulary and terminology. For example, the construction terminology can be collected and input from an existing glossary or database of construction project terms. This allows the machine learning models to learn and identify whether a received email correspondence relates to a construction project or is unrelated to a construction project. This feature may be useful when the present system operates on a general email system that includes non-construction correspondence that should be filtered out to avoid unnecessary classification and use of computing resources (e.g., avoid using the machine classifiers, avoid processor time, memory, etc.).

The correspondence text from each record is cleaned by removal of stop words, punctuations, numbers and HTML tags. Remaining words are stemmed to their root word with all lowercase characters.

A vocabulary was created from 600 correspondence threads of which 300 have known litigious vocabulary and 300 correspondence threads have known non-litigious vocabulary that contained the same ratio of litigious and non-litigious samples. Each of the 1129 correspondence threads was then vectorized to create a document term matrix (see Table 1) using the library text2vec, in which each row represents a unique correspondence thread and each column represents a feature in the vector space.

In one embodiment, each feature was normalized to its mean value of 0 and a standard deviation of 1. The dataset was split into 90% for training and 10% for testing. The ratio of litigious versus non-litigious correspondences was the same (or nearly the same) in both the test and the training dataset. The training dataset was fed as an input to the below-mentioned machine learning models. After the regularization of the models, a prediction was made on the test dataset as well as a dataset of previously unseen records (e.g., 10,000 previously unseen records with unknown text). 3000 records predicted as non-litigious by all three of the models were added back to the initial 1129 records as a co-training dataset to increase the size of the labeled train and test dataset for building the models.

With continued reference to FIG. 1, the following includes descriptions of the machine learning algorithms for each of the machine learning models: logistic regression 115, XGBoost 120, and Random forest 125.

1. Logistic Regression Model 115 with L1 Regularization

Input for the model 115 is the scaled document term matrix as described above [Table 1 and FIG. 2]. A penalized logistic regression model 115 with L1 regularization was built which imposes a penalty to the logistic model for having too many variables. The coefficients of some less contributive variables are forced to be exactly zero in Lasso Regression. In one embodiment, only the most significant variables are kept in the final model.

A convergence threshold for coordinate descent was set at 1e-1 and a maximum number of passes over the data for all lambda values was taken as 1e3.

Figure 3:
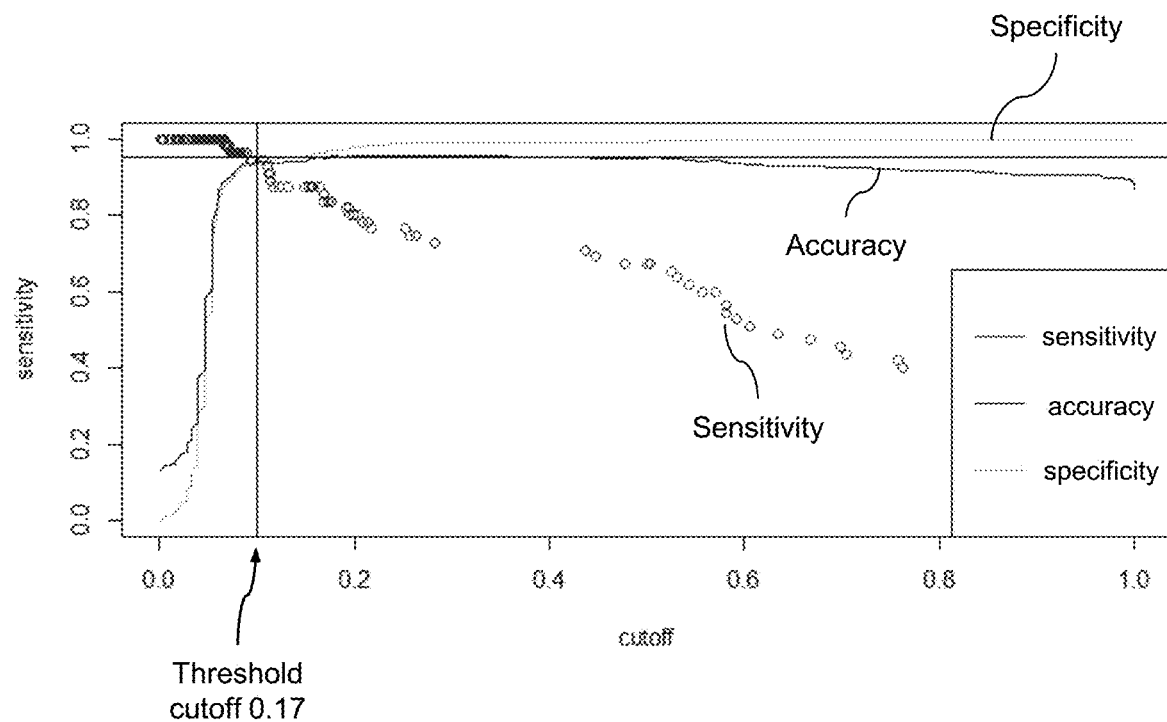
FIG. 3 illustrates one embodiment of a graph showing sensitivity, specificity, and accuracy versus probability of litigation risk cutoff value for choosing an initial threshold.

The output of the logistic regression model 115 is a probability value of a correspondence thread to be litigious. An initial threshold for the probability value of the correspondence thread to be litigious was taken to be any value above 0.17. The initial threshold was chosen to be the cutoff value for probability where the sensitivity, specificity, and accuracy are very close to each other using a grid search (see FIG. 3 showing Sensitivity, Specificity, Accuracy versus probability of litigation risk cutoff value graph). It was then slightly modified according to model performance across unseen datasets.

Model evaluation: A 4-fold cross-validation was performed with a logistic regression model. The "AUC" under "ROC curve" was taken as an evaluation metric. AUC is an "Area Under the ROC Curve." The AUC measures the entire two-dimensional area underneath the entire ROC curve from (0,0) to (1,1). The ROC curve stands for "Receiver Operating Characteristic" curve and is a graph showing the performance of a classification model at all classification thresholds. The ROC curve plots two parameters: True Positive Rate (TPR) and False Positive Rate (FPR), where the curve plots TPR vs. FPR at different classification thresholds.

TABLE 2

Confusion Matrix and Statistics for the test dataset

| | Reference | |
|---|---|---|
| Prediction | No | Yes |
| No | 350 | 10 |
| Yes | 8 | 45 |

The table compares results from the "Predication" of the model to the results from "Reference" classification for the same data set. "No" represents the number of documents that were found as not litigious and "Yes" represents the number of documents that were found to be litigious. The result from each document was compared.

From the evaluation of the logistic regression model 115, the following values were observed:

Accuracy: 0.95 Sensitivity: 0.98 Specificity: 0.82

KS statistics: 0.89 and within 4th decile

AUC under ROC: 0.98

KS statistics are determined from a KS (Kolmogorov-Smirnov) chart that measures performance of classification models. For example, KS is a measure of the degree of separation between positive and negative distributions. The KS is 100 if the scores partition the population into two separate groups in which one group contains all the positives and the other all the negatives.

Conversely, if the model cannot differentiate between positives and negatives, then the model is viewed as selecting cases randomly from the population. The KS would then be 0. In most classification models the KS will fall between 0 and 100, and that the higher the value, the better the model is at separating the positive from negative cases.

2. Gradient Boosting Algorithm Ensemble Algorithm Using XGboost

Input for the XGBoost model 120 is the scaled document term matrix as described above in Table 1. XGBoost is an optimized distributed gradient boosting library designed to be highly efficient, flexible and portable. It implements machine learning algorithms under the Gradient Boosting framework. In the XGBoost model 120, it is implemented with a gradient boosting tree algorithm. The input matrix is the same document term matrix as referred to above.

In tree-based ensemble methods, such as XGBoost or Random Forest, each feature is evaluated as a potential splitting feature, which makes them robust to unimportant/ irrelevant variables, because such variables that cannot discriminate between events/non-events will not be selected as the splitting variable and hence will be very low on the variable importance graph as well.

The following parameter values were selected for hyper-parameter tuning for regularization with 5-fold cross-validation after a grid search over a range of values:
eta=0.2,
gamma=6,
max_depth=3,
min_child_weight=1,
subsample=0.5,
colsample_bytree=0.5
nrounds=92

The "AUC" under the "ROC curve" was used as the evaluation metric. The output of the XGBoost model 120 is a probability value of the correspondence thread to be litigious. The threshold for the probability value of the correspondence thread to be litigious was taken to be any value above 0.5. The initial threshold was chosen to be the cutoff value for probability where the sensitivity, specificity, and accuracy are very close to each other using a grid search. It was then slightly modified according to model performance across unseen datasets.

Model evaluation: Confusion Matrix and Statistics for the test dataset:

TABLE 3

| | XGBoost | |
|---|---|---|
| | Reference | |
| Prediction | No | Yes |
| No | 353 | 6 |
| Yes | 5 | 49 |

From the evaluation, the following values were observed:
Accuracy: 0.96 Sensitivity: 0.81 Specificity: 0.99
KS statistics: 0.94 and within 4th decile
AUC under ROC: 0.99

3. Random Forest Classifier 125

The input for the random forest classifier model 125 is the scaled document term matrix as described above in Table 1. In one embodiment, the random forest classifier 125 is built with four (4) variables available for splitting at each tree node selected through a grid search over a range of values.

The "AUC" under the "ROC curve" was taken as the evaluation metric, and the number of trees was taken as 500.

Output of the random forest classifier model 125 is the probability value of a correspondence thread to be litigious. The threshold for the probability value of the correspondence thread to be litigious was taken to be any value above 0.074. The threshold value was chosen based on model performance across unseen datasets in the same way as was done for the logistic regression model 115.

TABLE 4

Model evaluation: Confusion Matrix and Statistics on the test dataset for Random Forest Classifier 125.

| | Reference | |
|---|---|---|
| Prediction | No | Yes |
| No | 331 | 6 |
| Yes | 27 | 49 |

From the evaluation, the following values were observed:
Accuracy: 0.92 Sensitivity: 0.89 Specificity: 0.92
KS statistics: 0.84 and within 4th decile
AUC under ROC: 0.97

Ensemble Majority Voting Classification

With continued reference to FIG. 1, each of the three base classifiers 115, 120, and 125 is an expert in a different region of the predictor space because each classifier treats the attribute space under different theoretical basis. The risk detection system 100 combines output of the three classifiers 115, 120, and 125 in such a way to produce an ensemble majority voting classifier 130 that is superior to any of the individual classifiers and their rules. Thus with an odd number of three classifiers, a majority vote/prediction for a final result would need at least two classifiers to vote/predict the same result (e.g., either predict "litigious" or "non-litigious" for a correspondence).

In one embodiment, given the random forest model's 125 generalization ability, its prediction was given double the weight compared to XGBoost 120 and logistic regression classifier 115 in the ensemble model 130. In other embodiments, each classifier's prediction may be given equal weight.

In operations, as an electronic correspondence (e.g., mail thread) is evaluated by each model 115, 120, 125, the output of each model is a probability of the mail thread being litigious. Based on the probability compared to a threshold value, a label is assigned for each mail thread. For example, the label is "1" if the probability of a mail thread being litigious as predicted by the model is greater than the threshold. The label is "0" if the probability of a mail thread being litigious as predicted by the model is less than the threshold. Consequently, the label is "0" if the mail thread is of a non-litigious nature.

Of course, other labels may be used to indicate litigious or non-litigious. In one embodiment, using ones "1" and zeros "0" as the labels allows the labels to be used as votes, which may then be combined from multiple machine learning classifiers to create a majority voting scheme of the ensemble model 130 as described below.

In one embodiment, the risk detection system 100 uses the following equation to combine the outputs from the three base classifiers into the ensemble model 130:

$$C(X)=2*h1(X)+h2(X)+h3(X) \quad \text{(Equation 2)}$$

Here C(X) is the sum of the weighted output of the three individual classifiers with h1(X), h2(X) and h3(X) being the output of the random forest 125, XGBoost gradient boosting 120, and the logistic regression classifier 115, respectively. Here C, h1, h2, and h3 are all functions of X, which represents the features or attributes identified from an electronic correspondence being evaluated. The output (prediction or vote) from the random forest h1 is given double weight with a multiplier of "2."

In one embodiment, the system 100 classifies an electronic correspondence as litigious if C(X)>=2. If C(X)<2, the correspondence is classified as non-litigious. Thus, the ensemble model predicts a correspondence to be litigious if any two of the three base classifiers or only the random forest classifier classifies the correspondence as litigious.

TABLE 5

Ensemble Model 130 evaluation: Confusion Matrix
and Statistics for the test dataset

| Prediction | Reference No | Yes |
|---|---|---|
| No | 332 | 5 |
| Yes | 27 | 50 |

From the evaluation, the following values were observed:
Accuracy: 0.92 Sensitivity: 0.90 Specificity: 0.92

Model Deployment—Operation/Execution Phase

With continued reference to FIG. 1, in one embodiment, once the ensemble model 130 is configured and trained, the ensemble model 130 is deployed (block 135) for operation. During operation, correspondence is monitored and evaluated (block 140, also FIG. 4) in near-real time for having litigious and non-litigious content. The ensemble model 130 generates risk predictions for each correspondence based on its text as explained above and generates an associated label as litigious or non-litigious. Components of the deployed model are shown in dashed line 145.

When the ensemble model 130 determines and predicts that a correspondence is a litigious risk, an electronic notification (block 160) is generated via the graphical user interface (block 140). The deployment and operation of the ensemble model is further described with reference to FIG. 4.

In one embodiment, the ensemble model 130 may be configured to provide a number of additional features that are generated and presented in a graphical user interface. These features may include dashboards 165, warnings and issues tracking 179, recommendations 175 and/or aggregation 180.

For example, dashboards (block 165) may be generated to graphically represent one or more types of results and/or summary data from the ensemble model 130. For example, a summary may include a number of litigious emails exchanged in a project visible to a particular organization/individual with the project within a specific interval of time. Other types of summary reports/information regarding the correspondences analyzed, statistics, and/or data analysis reports may be included in the dashboards 165 as graphical information. The display may also include whether each of the emails or correspondences displayed on the dashboard 165 has litigious content or not.

Warnings and issues tracking (block 170): In one embodiment, the system 100 highlights the topics and keywords that potentially point to the reason why the emails or correspondences have potential litigious content as identified by the machine learning models. The warnings and issues tracking 170 may also be combined with recommendations 175.

Recommendations (block 175): In one embodiment, the system 100 may categorize a project as a high, medium or low risk category depending on a number of litigious emails exchanged in a project visible to a particular organization/individual with the project within a specific interval of time. This will enable a concerned person to take appropriate measures as soon as possible.

Aggregation (block 180): In one embodiment, the system 100 may determine a percentage of litigious mails among all mails exchanged in a project visible to a particular organization/individual with the project within a specific interval of time.

Figure 4:
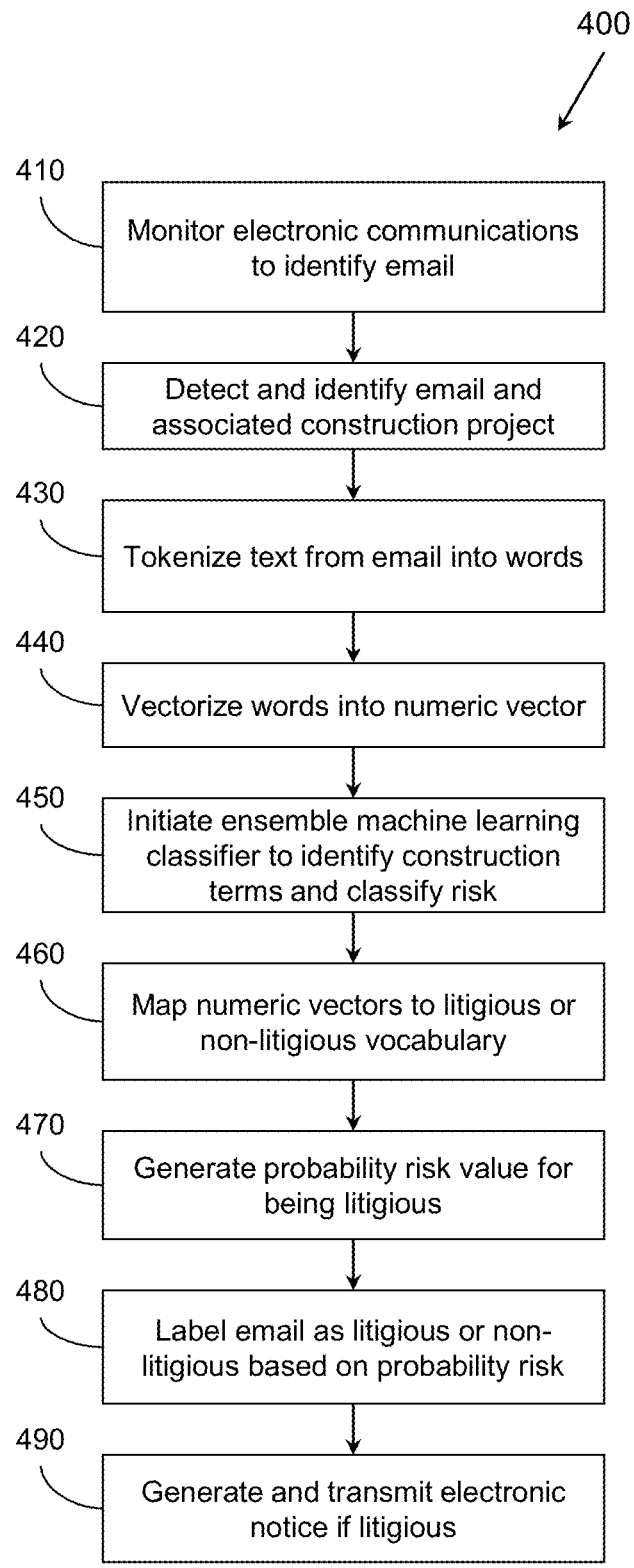
FIG. 4 illustrates an embodiment of a method associated with detecting potential risks from electronic communications of construction projects.

With reference to FIG. 4, one embodiment of a method 400 is illustrated that describes the operation of the ensemble model 130 during deployment and execution. As previously stated, the ensemble model 130 is configured to monitor electronic correspondence and detect litigation risk from the electronic correspondence that is associated with a construction or engineering project. In one embodiment, the ensemble model 130 is configured as part of a selected computing platform and/or email network that receives the electronic correspondence to be monitored.

Overall, after the machine learning classifiers are built from the training dataset (as described under FIG. 1-3), new incoming email correspondences are automatically passed through each classifier that is implemented. In the system of FIG. 1, three classifiers 115, 120, and 125 are included. After analysis of a correspondence, each classifier classifies/labels each of the incoming correspondences either as litigious or non-litigious. In another embodiment, each classifier may also classify the risk of being litigious as low, medium, or high. The ensemble model 130 may also continuously learn from user-feedback that helps to validate results, which is then fed back into the system for retraining. A more detailed explanation follows.

With reference to FIG. 4, once the method 400 is initiated and functioning on a targeted computing platform, at block 410, network communications are monitored to identify electronic correspondence received by the computing platform. For example, emails or other electronic correspondence are identified by an associated email system upon which the present system operates.

At 420, the system detects and identifies the email and its associated construction project. As previously explained, the machine learning models 115, 120, and 125 have been trained to identify construction and engineering vocabulary and terminology. This type of identification may assist to filter out emails or email threads that are not related to construction projects.

As another example, an organization may have one or more ongoing construction projects where each has a defined name and/or other metadata stored in the system that identifies each project. The system may parse and scan text from a received email and identify any known words or phrases that match an existing project ID and metadata. If found, the received email is associated with the existing project. Other ways of identification may include having a project ID in an email.

Each incoming email correspondence further passes through a number of functions for programmatically cleaning the correspondence. For example, at block 430, each email may be cleaned by removal of all non-Latin alphabet characters, html tags, punctuations, numbers and stop words. The email text may be tokenized by identifying and breaking down the correspondence text into words, punctuation marks, numeric digits, other objects in the text, etc (block 430). If the email includes at least one word with greater than 4 letters, then each word in the email is stemmed to their root word.

At 440, the tokenized text words from the email are vectorized and feature scaled. In one embodiment, vectorizing the text includes converting each word into numbers, which are numeric vectors. Vectorization maps words or phrases from vocabulary to a corresponding vector of real numbers, which may be used to find word predications, word similarities and/or semantics. The vectors of numbers (i.e. features) are features and may be scaled by normalizing the range of features of data.

At 450, after cleaning the correspondence text and feature scaling, the ensemble machine learning classifier of FIG. 1 is initiated to identify construction terms and classify litigation risk of the correspondence. The correspondence text is passed through each of the three machine learning classifiers 115, 120, and 125 of the system 100 (FIG. 1). Each classifier makes an individual prediction of whether the email text is litigious or non-litigious based on the learned training data.

In one embodiment at block 460, the numeric vectors generated at block 440 are mapped to numeric vectors associated with the defined datasets of known litigious vocabulary and known non-litigious vocabulary (e.g., from the previously generated document term matrix (see Table 1). In other words, the machine learning classifier processes the numeric vectors generated from the email correspondence by at least matching and comparing the numeric vectors to known numeric vectors that were generated from a set of defined litigious vocabulary and a set of defined non-litigious vocabulary.

At block 470, each of the three classifiers 115, 120, and 125 independently evaluates the correspondence and generates a prediction of a probability risk value for the correspondence being evaluated as previously described above. If the probability risk value exceeds the defined threshold value set for the associated classifier, then that classifier labels the correspondence as litigious (e.g., a value of "1") or non-litigious (e.g., value of "0"). In general, the output label is viewed as a "vote" since the output is either a "1" (litigious YES) or "0" (litigious NO). The multiple "votes" generated by the multiple classifiers is then combined for a majority vote determination.

At block 480, the three labels/votes output by the three classifiers are then combined using the majority voting scheme (e.g., equation 2) as part of the ensemble model 130. Based on the combined labels, the email correspondence is given a final label by the system as litigious or non-litigious based on the majority voting of the individual votes of the three classifiers. In another embodiment, a different odd number (amount) of classifiers may be used, or an even number of classifiers may be used with one or more classifiers having their votes more weighted to avoid a tie in voting.

In other words, the ensemble classifier comprises an odd number of independent machine learning classifiers (three classifiers in the above example). Each of the independent machine learning classifiers generates an output that classifies the email correspondence as being litigious or non-litigious. The output from each of the independent machine learning classifiers are all combined based at least in part on the majority vote scheme to generate the final label for the email as being litigious or non-litigious.

At block 490, the system is configured to generate an electronic notice when the final label indicates that the correspondence is litigious. In one embodiment, the electronic notice includes data that identifies the correspondence, the associated construction project, and an alert message regarding the potential litigation risk. The electronic notice may also include additional data such as the email sender and receiver. The electronic notice may highlight or visually distinguish the text from the email correspondence related to litigious vocabulary as identified by the machine learning classifiers. The electronic notice is then transmitted to a remote device and/or displayed on a graphical user interface to allow a user to receive the notice and have access to the correspondence in near real time so that an action may be taken to address issues in the correspondence.

In another embodiment, the system transmits the electronic notice to a designated remote device (e.g., via address, cell phone number, or other device ID) including at least the identification of the email and the label that indicates the email as litigious or non-litigious. In response to receiving the electronic notice, the remote device provides a user interface that displays the data from the electronic notice and allows input to validate the label and change the label if a user believes the label is incorrect. This may include viewing any identified suspicious text from the email correspondence to allow the user to determine if the text is litigious or non-litigious. The user interface allows the label to be selected and changed. The system may then transmit the changed label and corresponding email as feedback to the machine learning classifier to retrain the machine learning classifier. The validation mechanism is further described in the following section.

Validation and Continuous Learning

With reference again to FIG. 1, in one embodiment, the correspondence text for one or more predictions made by the ensemble model 130 may be made available to a user of the system 100. This provides a validation mechanism so that the user is able to apply human decision making to validate the prediction and the associated label (litigious or non-litigious). As part of the validation mechanism, the system 100 provides a feedback user interface 150 that allows a user to input corrections to retag or otherwise re-label selected correspondence as litigious or not litigious in case the user does not agree with the predictions and labels made by the ensemble model 130.

A continuously learning process is implemented to retrain the ensemble model 130 with the new feedback data that changes previous labels. The ensemble model 130 receives the label changes and other feedback data as input to be combined and retrained with the existing training dataset of classified data (block 155). This feedback data 155 is used to re-train the ensemble model 130 with the previous and newly labeled correspondence bodies. The retrained ensemble model 130 will replace the existing model if the retrained model outperforms the existing model. This may be based on executing a number of comparison tests to determine the model's accuracy in predictions. Using this feedback mechanism, the risk detection system 100 will learn to classify correspondences more accurately over a period of time.

With the present system and method, email correspondence may be classified as litigious or not litigious in real time or near-real time. Such correspondences classified as litigious may indicate early signs of potential issues that could lead to larger disputes or litigation that could most likely have adverse or catastrophic impact on a project/asset under construction. Thus the present system enables an early action(s) to be taken to effectively mitigate this risk of litigation whenever it is proactively identified by the present system.

Severity Detection System

Figure 5:
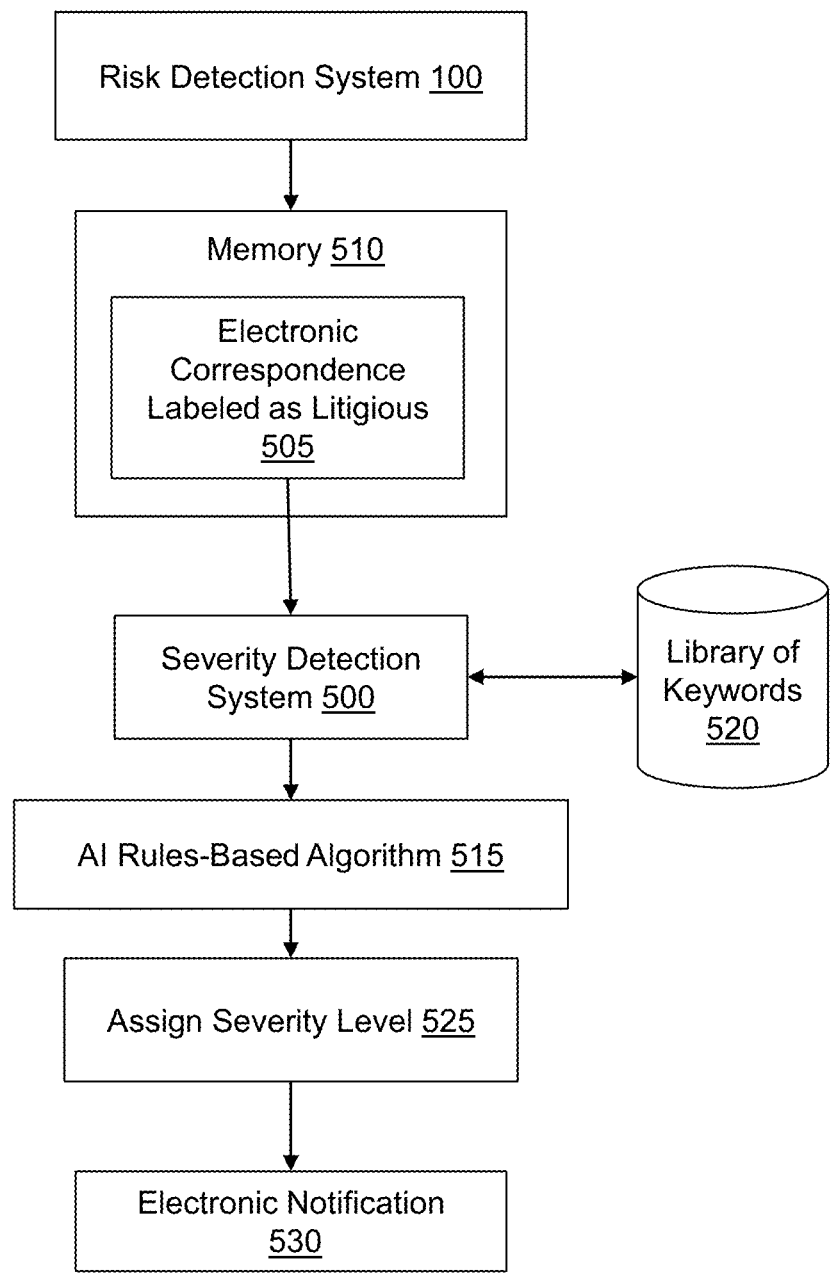
FIG. 5 illustrates one embodiment of a machine learning system associated with detecting/identifying severity of risk from electronic correspondence.

With reference to FIG. 5, one embodiment of the severity detection system 500 is shown. The severity detection system 500 may be part of a computing system that includes at least one processor configured to execute instructions and at least one memory operably connected to the at least one processor and configured to at least store and provide computer-executable instructions to the at least one processor.

As an overview, a risk detection system should consider the severity of potential impact of a litigation risk in addition to initially detecting that a risk exists (which is performed by the risk detection system 100). Identifying a severity level of risk may assist to properly suggest and take a corrective action and/or make decisions. In a construction/engineering project, an electronic correspondence that has a high severity litigation risk is a greater concern and matters more than one with a low severity litigation risk. Not all risks are severe and not all risks are certain to lead to litigation costs to stakeholders in a construction project. Therefore, the severity detection system 500 is configured to estimate if an identified risk is certain, is fairly possible, or is very remote. The risk level then allows for prioritizing the high severity risks for which action should be taken as soon as possible. Taking action at an appropriate time may help to mitigate damages in a project by, for example, resolving disputes and/or correcting deficiencies before litigation is initiated.

In one embodiment, the severity detection system 500 is configured to detect and/or identify a severity level of litigation risk for an electronic correspondence 505 based on at least the text and language of the electronic correspondence 505. The severity detection system 500 receives as input (into memory 510) the electronic correspondence 505 that was previous labeled as potentially litigious by the risk detection system 100. As previously described, the risk detection system 100 includes a machine learning classifier configured to identify terminology from text of electronic correspondence and to classify the electronic correspondence with a risk as being litigious or non-litigious based at least on the terminology.

The severity detection system is configured with an artificial intelligence (AI) rules-based algorithm 515. The AI rules-based algorithm 515 is configured with multiple levels of rules to evaluate and judge whether text represents a high level, a medium level, or a low level of severity risk for litigation. The rules use a library of keywords 520 and are applied to the text of the electronic correspondence 505.

In one embodiment, the library of keywords 520 are pre-generated and include a list of potentially litigious words/terms that is created from analysis and observations from pre-existing emails and other correspondences. The library of keywords 520 is used by the security detection system 500 to assess and assign a severity level 525 to the electronic correspondence 505 (described in more detail below). For example, the library of keywords may be prepared in the training phase (as described with reference to FIG. 1) that evaluates known litigious language and known non-litigious language. The training phase may include analyzing a sample data set of correspondences (e.g., 80-100 emails) that were analyzed based on known and/or typical construction project terms. Keywords were then selected from the text of the data set emails that were believed to be litigious in nature and each keyword was assigned a severity level of high, medium, or low.

In one embodiment, a first group of keywords (e.g., about 10-20 words) may be identified and assigned as representing a high severity level of litigation risk (highly litigious keywords), for example but not limited to: 'arbitration', 'arbitrate', 'lawsuit', 'court case', 'legal notice', 'legal proceeding', 'gross', 'critical', 'legal implications', 'serious', 'harm', etc. A second group of keywords may be identified and assigned as representing a medium severity level of litigation risk, for example but not limited to: 'ncr' (non-conformance report), 'non-conformance', 'unhappy', 'difficult', 'failure', 'defect', 'mistake', etc. All other remaining keywords that are not in the first or second groups are assigned a low severity level of litigation risk. Of course, the selection of the first and second groups of keywords may depend on the type of correspondence being analyzed by the system. For example, besides clearly litigious words like "lawsuit," a construction project uses terminology that is different from a software project. Thus, different keywords may be identified.

After completion of the rules-based algorithm 515, the severity level 525 is assigned to the electronic correspondence 505 as a high level, a medium level, or a low level. Of course, other severity levels may be implemented, for example, using numbers that represent levels (e.g., 0-5, 1-10) where the higher the number, the higher the severity level of risk, or vice versa. Thereafter, the system 500 generates and transmits an electronic notice/notification 530 to a remote computer over a communication network that identifies the electronic correspondence and the assigned level of litigation risk. The system 500 is described in greater detail with reference to FIG. 6.

Figure 6:
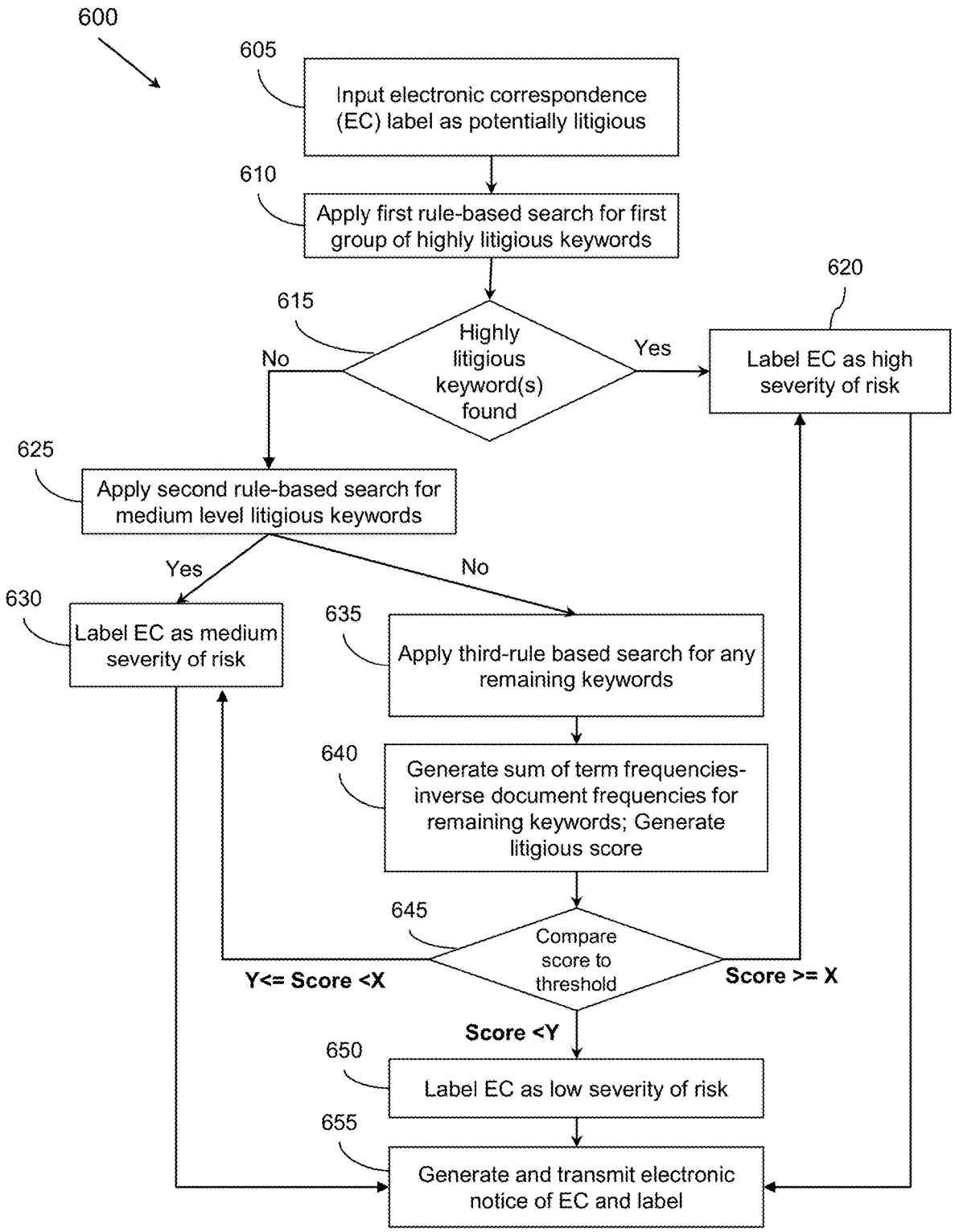
FIG. 6 illustrates one embodiment of a method for detecting/identifying severity of risk from electronic correspondence by the system of FIG. 5.

With reference to FIG. 6, one embodiment of a method 600 is illustrated that describes the functions of the severity detection system 500.

At block 605, the system 500 receives a target electronic correspondence (EC) to be evaluated and its contents are input into a memory. For example, the target electronic correspondence may be received directly as an output of the risk detection system 100 after the target electronic correspondence has been labeled as potentially litigious by the machine learning classifier as previously described. Correspondences determined as non-litigious by the risk detection system 100 do not need to be input to the severity detection system 500 since they are non-litigious and thus will not have a risk severity level. In another embodiment, multiple target electronic correspondences that are identified as litigious may be stored in a data structure and be queued for evaluation. The severity detection system 500 may then access the data structure, retrieve one or more electronic correspondences, and then evaluate them according to the method 600. For purposes of discussion, a single target electronic correspondence is described in the evaluation.

At block 610, a first rule-based search is applied that performs a first rule that searches the text of the target electronic correspondence for one or more first designated keywords that represent high litigious risk. This first group of keywords are defined in the library of keywords 520 stored in a data structure. The library is accessed and searched to retrieve all the keywords that have been assigned as a high severity level of litigation risk. The first rule executes a parsing functioning to parse the text of the target electronic correspondence, extract words and/or phrases, and compares the extracted words with the high risk keywords. In other words, the first rule determines if the text includes the presence of any of the high litigious risk keywords (block 615).

In response to one or more of the high litigious risk keywords being found in the text, the method moves to block 620 and the target electronic correspondence is marked/labeled as a high level of litigation risk. A first output may then be generated that identifies the mark/label and the associated target electronic correspondence. The first output is part of the electronic notice that is generated by the method 600.

At block 615, in response to the first rule search not finding the presence of any of the first designated keywords (highly litigious keywords) in the text, the method moves to block 625 and a second rule-based search is performed. The second rule-based search performs a similar process as the first rule-based search but uses a second group of keywords from the library of keywords that are designated as medium severity level of litigious risk. The text of the electronic correspondence is then searched for the presence of any of the second designated keywords (medium level risk).

In response to one or more of the second designated keywords being found in the text, the system marks/labels the target electronic correspondence as a medium level of litigation risk (block 630) and generates an output that identifies the mark/label and the associated target electronic correspondence. The output is part of the electronic notice that is generated by the method 600.

In response to one or more second designated keywords not being found in the text, the system performs a third rule-based search (block 635). The third rule-based search is configured to search the text of the target electronic correspondence for any remaining keywords that have a match in the library of keywords 520. This includes accessing and retrieving the remaining keywords from the library that are assigned a low level of litigation risk and identifies all words from the electronic correspondence that matches those keywords. Remember that the electronic correspondence was originally labeled as potentially "litigious" by the machine classifier. So when the rule-based algorithm reaches the third rule, there should still be some level of litigation risk associated to the electronic correspondence. However at this point, the risk level is not evident since none of the high risk level keywords or medium risk level keywords are present.

To determine the risk level, the third rule calculates and generates a litigious score based on a sum of term frequencies-inverse document frequencies (TD-IDF or TD*IDF) formula using the remaining keywords found in the text of the electronic correspondence (block 645). The TD-IDF is the product of two statistics, term frequency and inverse document frequency. This algorithm is described in more detail below. Then based on the litigious score as compared to a threshold, the system marks/labels the target electronic correspondence with a level of litigation risk of either a high level, a medium level, or a low level.

In general, the remaining keywords are low risk words are close to the border line of low risk or no risk. So when a number of those words appear in some frequency in the electronic correspondence (e.g., email), the email is labeled as low risk. Words like "breach" and "contract" are words that could be in a low risk email. Using the frequency formula, the formula may determine that the occurrence of these terms together in the email appear in a high frequency. As such, the litigious score (TF-IDF score) will be higher. Thus, the score could be high enough (based on a threshold) to label the email has HIGH risk even though no high risk keywords exist.

In one embodiment, threshold values for identifying a high risk level, a medium risk level, and a low risk level may be determined by applying the frequency formula to a data set of correspondences and using the library of keywords. A litigious score is calculated for each correspondence. Scores are grouped together for emails that are considered high, medium, and low risk levels. The threshold values for each level are then selected. For example, a litigious score that is greater than or equal to X is high risk. A score between X and Y is medium risk and a score less than Y is low risk. In the following example, X=1.61 and Y=0.95. Of course, these threshold values and associated ranges will be different when using different sample data sets of correspondence to determine the thresholds.

In another embodiment, threshold values for identifying risk severity may be determined after studying the sum of TF-IDF scores of litigious keywords in a data set of potentially litigious mails (e.g., 70-100+ correspondences) which were labelled by a domain expert as high risk level, a medium risk level, and a low risk level. The data set of litigious mails included a number of emails of each category: high, medium and low severity as labelled by the domain expert. The TF-IDF scores were then compared to and grouped by the category of initial labelling of high, medium, and low risk level for the associated correspondence. Ranges and cutoff values for the TF-IDF scores between each risk level was then selected based on the observed comparison and grouping of values.

With continued reference to block 645 in FIG. 6, the litigious score for the target correspondence is compared to the threshold values of X=1.61 and Y=0.95. In one embodiment, the threshold for identifying a high risk level is a score of 1.61 (e.g., X) or higher: litigious score >=1.61. The EC is then labeled as high severity of risk (block 620) and then the electronic notice is generated accordingly (block 655).

For a medium risk level, a range of values may be between X=1.61 and Y=0.95 are used as: 0.95<=litigious score <1.61. Thus, the litigious score is between a range of values up to the threshold X value of 1.61. The EC is then labeled as medium severity of risk (block 630) and then the electronic notice is generated accordingly (block 655).

For a low risk level, the litigious score <0.95. Thus the litigious score is below the range of values for medium risk. The EC is then labeled as a low severity of risk (block 650) and then the electronic notice is generated accordingly (block 655).

At block 655, the electronic notice is generated and transmitted to a remote computer over a communication network. The electronic notice is generated with identification of the target electronic correspondence and the level of litigation risk. The electronic notice may be transmitted to a customer to allow the customer to decide an action in a timely manner.

In one embodiment, the third rule and the sum of term frequencies-inverse document frequencies formula (TF-IDF scores) are implemented as follows.

In one embodiment, the third rule is applied on the target EC (email) at blocks 635 and 640 since the target EC was not labelled by the first or the second rule. The third rule is configured to parse the text of the EC, search for and remove any stop words from the text of the target EC. Example stop words are commonly used words and are regarded as words which do not add much meaning to a sentence such as "the", "is", "and." All remaining words in the text were stemmed to their original root words. Then the sum of term frequencies-inverse document frequencies (TF-IDF scores) of only potentially stemmed litigious words contained in the email that are also present in the library of keywords, which were also stemmed to their root word 520 is calculated for a collection of known potentially litigious emails along with new incoming potentially litigious emails, which are the target electronic correspondence being evaluated.

The formal measure of how concentrated the occurrences of a given word are in a relatively few documents is called TF*IDF (Term Frequency times Inverse Document Frequency). In general, TF*IDF is a numerical statistic that is reflect show important a word is to a document in a collection of documents. Term Frequency is computed as shown in Equation 1. Suppose we have a collection of N documents. Define $f_{ij}$ to be the frequency (number of occurrences) of term (word) i in document j. Then, define the term frequency $TF_{ij}$ as $$TF_{ij} = \frac{f_{ij}}{\max_k f_{kj}} \quad \text{(Eq. 1)}$$

The IDF for a term is defined as follows. Suppose term i appears in $n_i$ of the N documents in the collection. Then $IDF_i = \log(N/n_i)$ (Eq 2). The TF.IDF score for term i in document j is then defined to be $TF_{ij} \times IDFi$ (Eq 3).

kj is all the documents. Also, $\max_k f_{kj}$ is the maximum number of occurrences of any term (except stop words) in the same document j. Term frequency of term i in document j which is $f_{ij}$, is normalized by dividing it with $\max_k f_{kj}$.

Correspondence (e.g., emails) that had a sum of TF-IDF scores of litigious keywords higher than or equal to 1.61 were labelled by the system as "high", those between 1.61 and 0.95 were labelled by the system as "medium" and those lower than 0.95 were labelled by the system as "low" level of litigation risk. After the end of the third rule, every correspondence evaluated is classified by the machine as having either 'high', 'medium' or 'low' level of severity of litigation risk.

FIG. 7 illustrates a sample correspondence text 700. The present algorithm applied to the text 700 determined the following (in block 705):

Keywords in Text: breach, issue, suit
TF-IDF Sum of litigious words: 0.404248
Machine Label assigned to text: Low severity After being scored and labeled with severity, each potential litigious electronic correspondence may be provided to a customer. For example, at block 655 (in FIG. 6), the electronic notice is generated and transmitted to a remote computer over a communication network. The electronic notice is generated with identification of the target electronic correspondence and the labeled level of litigation risk. The electronic notice may be transmitted to a customer to allow the customer to decide an action in a timely manner. The electronic notice may be generated in different forms, for example, an email message, an instant message, a text message, an on-device notification, a group message, or other message format.

Figure 8:
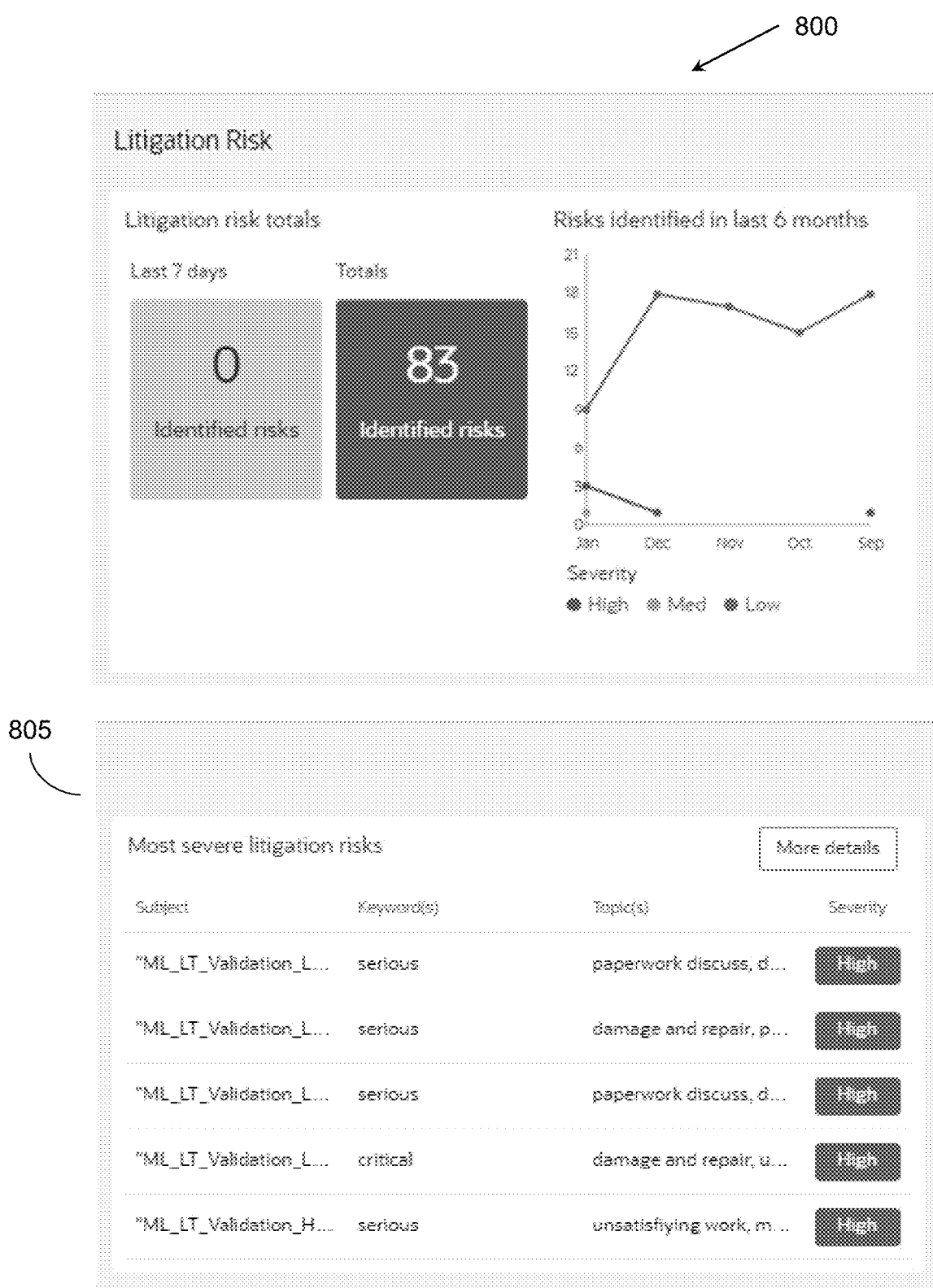
FIG. 8 illustrates one embodiment a dashboard and graphical user interface associated with identified risks.

With reference to FIG. 8, in one embodiment, the electronic notice is transmitted to a dashboard 800 as part of a graphical user interface. The dashboard 800 may be part of an application or website that collects and aggregates data from electronic notices. A user may access the application or website by logging into an account and viewing the dashboard. The dashboard 800 is configured to provide an overall summary showing "Litigation risk totals", for example, 0 Identified risks (last 7 days) and 83 Identified Risks (Total for a given project). The dashboard 800 may include a line graph with lines that track the number of risks identified for each level High, Medium, and Low over a time period (e.g., x-axis shows months January, December, November, October, September . . . ). The dashboard 800 can include selectable functions to apply to the data such as a filter function that can select and show specific levels/categories of risk and their associated results.

The graphical user interface may also include a detailed display area 805 that includes a list of emails identified as "Most severe litigation risks". Columns of data are "Subject" which is the subject line from email, "Keyword(s)" which show the litigious keyword(s) found in the text, "Topic(s)" identifies the topic of the email, and "Severity" which is the severity risk level assigned by the system. In one embodiment, this list is sorted on the display by "HIGH" severity first. The dashboard functions to provide an alert and/or notice so that a user can identify the correspondence and associated project that are at risk and take an appropriate action to mitigate issues.

In another embodiment of the method 600 in FIG. 6, the first and second rules may be combined and performed together. For example, blocks 610 to 630 may be combined and perform the following functions. After the electronic correspondence (EC) is received and input to memory, a first group of keywords from a library of keywords 520 is identified, where the first group of keywords indicate a high level of litigation risk. The first group is stored. Also, a second group of keywords from the library of keywords 520 is identified, where the second group of keywords indicate a medium level of litigation risk. The second group is stored.

The memory is accessed and the text from the target electronic correspondence (EC) is analyzed to determine a presence of terms that correspond to one or more of the first group of keywords or the second group of keywords. In other words, the system determines if any of the high level keywords or medium level keywords are present in the text. When the presence of any of these terms is found, an indication is generated on a display screen that the target electronic correspondence is labeled as a high level of litigation risk or a medium level of litigation risk. The label is based on which keywords were found in the text. If any high risk keywords are found, then the EC is labeled as high risk regardless if there are any medium risk words.

When the presence of the terms (high risk or medium risk) is not found in the text, then the third rule is executed as previously described (blocks 635 to 650). This includes (i) searching the text of the target electronic correspondence for remaining keywords that have a match in the library of keywords; (ii) generating a litigious score based on a sum of term frequencies-inverse document frequencies using the remaining keywords; and (iii) based on the litigious score as compared to a threshold, generating a label for the target electronic correspondence that indicates a level of litigation risk.

After the label is generated for the target EC, the system generates and transmits an electronic notice to a remote computer over a communication network that identifies the target electronic correspondence and the level of litigation risk (block 655).

In another embodiment, the electronic notice is generated to include identification of the target electronic correspondence, the level of ligation risk, and one or more of the keywords found in the text that match the first group of keywords or the second group of keywords. A dashboard may then be generated as part of a graphical user interface as previously described. The dashboard may be configured to display a list of electronic correspondences that have been identified and labeled with the level of litigation risk from received electronic notices. Transmitting the electronic notice to the dashboard of the graphical user interface causes information from the electronic notice to be displayed on the dashboard.

This method of processing uses an application specific artificial intelligence capable of identifying key words related to litigation in the construction industry and computation of the frequency of their occurrence compared to other words.

Overall, the present severity detection system 500 provides an improved technique using an AI-based algorithm for identifying the severity of litigation risks associated with construction and/or engineering projects. As such, the present system can forecast potential disputes or litigations that may occur by analyzing correspondences, which could include hundreds or thousands of text communications that was not possible before. The present system may monitor text correspondences in real-time or in near-real time (daily or weekly) and classify those correspondences as potentially litigious with a level of risk severity. The system then outputs an alert and/or notice so that a user can identify the correspondence and associated project and take an appropriate action to mitigate issues.

No action or function described or claimed herein is performed by the human mind. An interpretation that any action or function can be performed in the human mind is inconsistent and contrary to this disclosure.

Cloud or Enterprise Embodiments

In one embodiment, the risk detection system 100 is a computing/data processing system including an application or collection of distributed applications for enterprise organizations. The applications and risk detection system 100 may be configured to operate with or be implemented as a cloud-based networking system, a software as a service (SaaS) architecture, or other type of networked computing solution. In one embodiment the risk detection system is a centralized server-side application that provides at least the functions disclosed herein and that is accessed by many users via computing devices/terminals communicating with the risk detection system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 9:
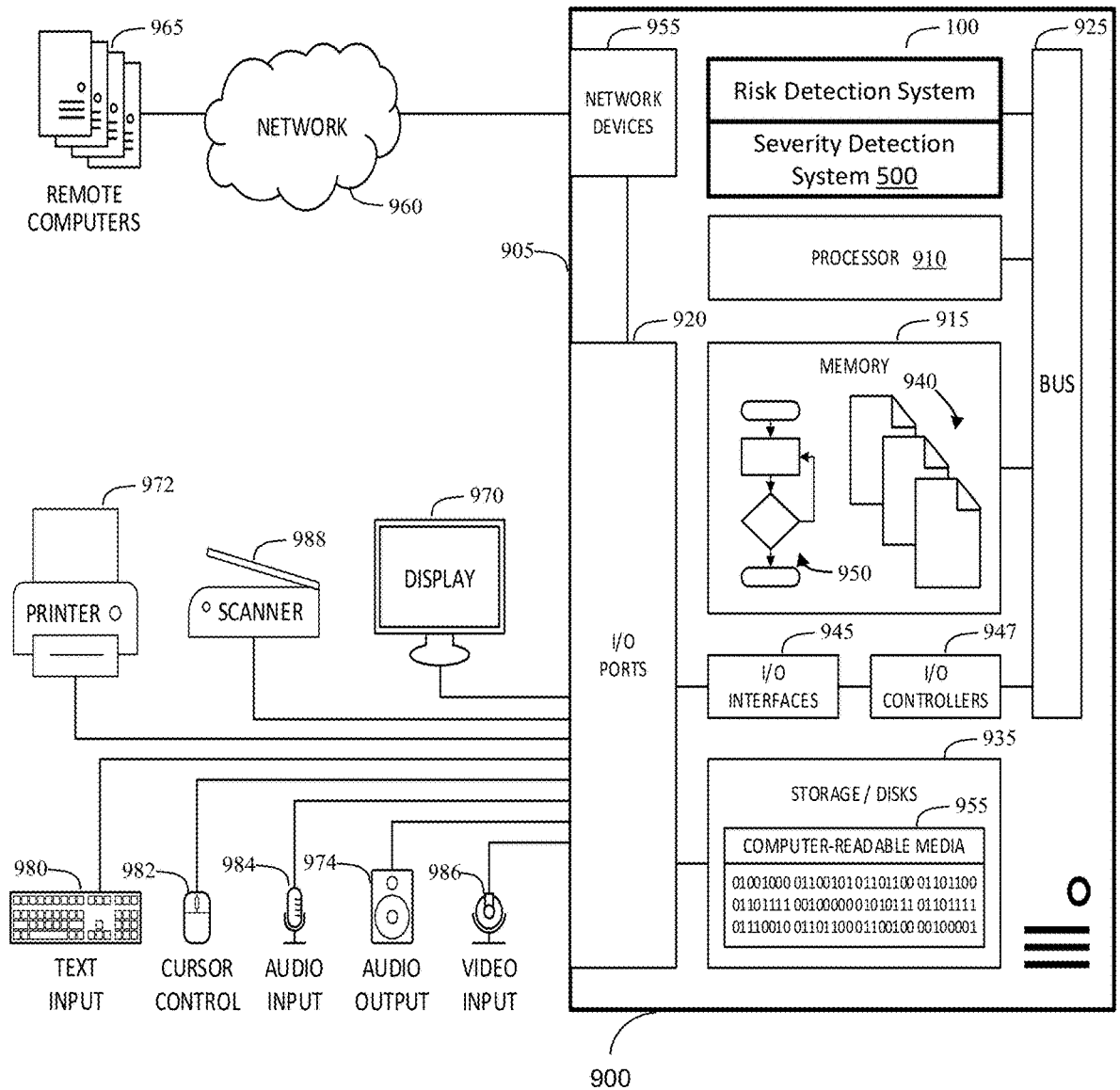
FIG. 9 illustrates an embodiment of a computing system configured with the example systems and/or methods disclosed.

In one embodiment, FIG. 9 illustrates a computing system 900 configured and/or programmed as a special purpose computing device with one or more components of the present risk prediction system 100 and methods described herein, and/or equivalents.

The example computing system 900 may be a computer 905 that includes a hardware processor 910, a memory 915, and input/output ports 920 operably connected by a bus 925. In one example, the computer 905 is configured with the risk prediction system 100 and/or the severity detection system 500 as shown and described with reference to FIGS. 1-8. In different examples, the risk prediction system 100 may be implemented in hardware, a non-transitory computer-readable medium with stored instructions, firmware, and/or combinations thereof.

In one embodiment, risk prediction system 100 and/or the computer 905 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The risk prediction system 100 may also be implemented as stored computer executable instructions that are presented to computer 905 as data 940 that are temporarily stored in memory 915 and then executed by processor 910.

Generally describing an example configuration of the computer 905, the processor 910 may be a variety of various processors including dual microprocessor and other multi-processor architectures. A memory 915 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 935 may be operably connected to the computer 905 via, for example, an input/output (I/O) interface (e.g., card, device) 945 and an input/output port 1020. The disk 935 may be, for example, a magnetic disk drive, a solid-state disk drive, a floppy disk drive, a tape drive, a Zip drive, a flash memory card, a memory stick, and so on. Furthermore, the disk 935 may be a CD-ROM drive, a CD-R drive, a CD-RW drive, a DVD ROM, and so on. The memory 915 can store a process 950 and/or a data 940, for example. The disk 935 and/or the memory 915 can store an operating system that controls and allocates resources of the computer 905.

The computer 905 may interact with input/output (I/O) devices via the I/O interfaces 945 and the input/output ports 920. The communications between the processor 910 and the I/O interfaces 945 and ports 920 are managed by an input/output controller 947. The input/output ports 920 may include, for example, serial ports, parallel ports, and USB ports.

The computer 905 can operate in a network environment and thus may be connected to the network devices 955 via the I/O interfaces 945, and/or the I/O ports 920. Through the network devices 955, the computer 905 may interact with a network 960. Through the network 960, the computer 905 may be logically connected to remote computers 965. Networks with which the computer 905 may interact include, but are not limited to, a LAN, a WAN, and other networks.

The computer 905 can send and receive information and signals from one or more output devices or input devices through I/O ports 920. The output devices include one or more displays 970, printers 972 (such as inkjet, laser, or 3D printers), and audio output devices 974 (such as speakers or headphones). The input devices include one or more text input devices 980 (such as keyboards), cursor controllers 982 (such as mice, touchpads, or touch screens), audio input devices 984 (such as microphones), video input devices 986 (such as video and still cameras), or other input devices, such as scanner 988. Input/output devices may further include the disk 935, the network devices 955, and so on. In some cases, the computer 905 can be controlled by information or signals generated or provided by input or output devices, such as by text input devices 980, cursor controllers 982, audio input devices 984, disk 935, and network devices 955.

Definitions and Other Embodiments

In another embodiment, the described methods and/or their equivalents may be implemented with computer executable instructions in a form of an executable application (stand-alone application or part of a bigger system). Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
   at least one processor configured to execute instructions;
   at least one memory operably connected to the at least one processor and configured to at least store and provide computer-executable instructions to the at least one processor;
   a machine learning classifier configured to identify terminology from text of electronic correspondence and to classify the electronic correspondence with a risk as being litigious or non-litigious based at least on the terminology;
   a non-transitory computer-readable medium that includes stored thereon computer-executable instructions that when executed by the at least one processor cause the computing system to:
      input, into the at least one memory, a target electronic correspondence that has been classified as being litigious by the machine learning classifier;
      perform a first rule that searches the text of the target electronic correspondence for one or more first designated keywords that represent high litigious risk;
      wherein the one or more first designated keywords are defined in a library of keywords stored in a data structure;
      in response to the one or more first designated keywords being found in the text, mark the target electronic correspondence as a high level of litigation risk and generate a first output of the mark;
      in response to the one or more first designated keywords not being found in the text:
         (i) perform a second rule that searches the text of the target electronic correspondence for one or more second designated keywords that represent medium litigious risk and are defined in the library of keywords; and
         (ii) in response to the one or more second designated keywords being found in the text, mark the target electronic correspondence as a medium level of litigation risk and generate a second output of the mark;
      in response to the one or more second designated keywords not being found in the text:
         (i) perform a third rule that searches the text of the target electronic correspondence for remaining keywords that have a match in the library of keywords;
         (ii) generate a litigious score based on a sum of term frequencies-inverse document frequencies using the remaining keywords; and
         (iii) based on the litigious score as compared to a threshold, mark the target electronic correspondence with a level of litigation risk; and
      transmit an electronic notice to a remote computer over a communication network that identifies the target electronic correspondence and the level of litigation risk.

2. The computing system of claim 1, wherein marking the target electronic correspondence with a level of litigation risk based on the litigious score further includes instructions that when executed by at least the processor cause the processor to:
   mark the target electronic correspondence as a high level of litigation risk when the litigious score is above the threshold;
   mark the target electronic correspondence as a medium level of litigation risk when the litigious score is between a range of values below the threshold; and
   mark the target electronic correspondence as a low level of litigation risk when the litigious score is below the range of values.

3. The computing system of claim 1, wherein the library of keywords comprises a list of keywords wherein each keyword is assigned as representing a high level, a medium level, or a low level of litigation risk.

4. The computing system of claim 1, wherein the computer-executable instructions are further configured to:
   generate an electronic notice to include identification of the target electronic correspondence, the level of ligation risk, and one or more of the keywords found in the text that match the first designated keywords or the second designated keywords;
   generate a dashboard as part of a graphical user interface configured to display a list of electronic correspondences that have been identified and labeled with the level of litigation risk from received electronic notices; and
   transmit the electronic notice to the dashboard of the graphical user interface that causes information from the electronic notice to be displayed on the dashboard.

5. The computing system of claim 1, wherein the computer-executable instructions that generate the litigious score are further configured to:
   remove stop words from the text of the target electronic correspondence; and
   calculate the sum of term frequencies-inverse document frequencies using the remaining keywords.

6. The computing system of claim 1, wherein the computer-executable instructions that transmit the electronic notice to a remote computer are further configured to:
   transmit the electronic notice to the remote computer and cause a dashboard of a graphical user interface to display identification of the target electronic correspondence, the level of ligation risk, and one or more of the keywords found in the text.

7. The computing system of claim 1, wherein the computer-executable instructions are further configured to:
   generate a dashboard on a graphical user interface that includes a line graph representing a separate line that tracks a number of risks identified for each of the high level of litigation risk, the medium level of litigation risk, and the low level of litigation risk over a time period.

8. A non-transitory computer-readable medium that includes stored thereon computer-executable instructions that when executed by at least a processor of a computer cause the computer to:
   input, into a memory, a target electronic correspondence that has been classified as being litigious by a machine learning classifier;
   identify a first group of keywords from a library of keywords, wherein the first group of keywords indicate a high level of litigation risk;
   identify a second group of keywords from the library of keywords, wherein the second group of keywords indicate a medium level of litigation risk;
   access the memory and analyze text from the target electronic correspondence to determine a presence of terms that correspond to one or more of the first group of keywords or the second group of keywords;
   when the presence of terms is found, generate an indication on a display screen that the target electronic correspondence is labeled as the high level of litigation risk or the medium level of litigation risk;

when the presence of terms is not found:
  (i) search the text of the target electronic correspondence for remaining keywords that have a match in the library of keywords;
  (ii) generate a litigious score based on a sum of term frequencies-inverse document frequencies using the remaining keywords; and
  (iii) based on the litigious score as compared to a threshold, generate a label for the target electronic correspondence that indicates a level of litigation risk;

transmit an electronic notice to a remote computer over a communication network that identifies the target electronic correspondence and the level of litigation risk.

9. The non-transitory computer-readable medium of claim 8, further comprising instructions that when executed by at least the processor cause the processor to:
execute the machine learning classifier configured to identify construction terminology and to classify text with a risk as being litigious or non-litigious.

10. The non-transitory computer-readable medium of claim 8, wherein the instructions to analyze the text further comprise instructions that when executed by at least the processor cause the processor to:
perform a first rule that searches the text of the target electronic correspondence for one or more of the first group of keywords that represent the high level of litigious risk;
in response to the one or more of the first group of keywords being found in the text, label the target electronic correspondence as the high level of litigation risk;
in response to the one or more of the first group of keywords not being found in the text:
  (i) perform a second rule that searches the text of the target electronic correspondence for the one or more of the second group of keywords that represent the medium level of litigation risk;
  (ii) in response to the one or more of the second group of keywords being found in the text, label the target electronic correspondence as the medium level of litigation.

11. The non-transitory computer-readable medium of claim 8, wherein generating the label for the target electronic correspondence with the level of litigation risk based on the litigious score further includes instructions that when executed by at least the processor cause the processor to:
label the target electronic correspondence as the high level of litigation risk when the litigious score is above the threshold;
label the target electronic correspondence as the medium level of litigation risk when the litigious score is between a range of values up to the threshold; and
label the target electronic correspondence as a low level of litigation risk when the litigious score is below the range of values.

12. The non-transitory computer-readable medium of claim 8, further comprising instructions that when executed by at least the processor cause the processor to:
generate the electronic notice to include identification of the target electronic correspondence, the level of ligation risk, and one or more of the keywords found in the text that match the first group of keywords or the second group of keywords;
generate a dashboard as part of a graphical user interface configured to display a list of electronic correspondences that have been identified and labeled with the level of litigation risk from received electronic notices; and
wherein the instructions to transmit the electronic notice are further configured to transmit the electronic notice to the dashboard of the graphical user interface that causes information from the electronic notice to be displayed on the dashboard.

13. The non-transitory computer-readable medium of claim 8, further comprising instructions that when executed by at least the processor cause the processor to:
transmit the electronic notice to the remote computer and cause a dashboard of a graphical user interface to display identification of the target electronic correspondence, the level of ligation risk, and one or more of the keywords found in the text.

14. The non-transitory computer-readable medium of claim 8, further comprising instructions that when executed by at least the processor cause the processor to:
generate a dashboard on a graphical user interface that includes a line graph representing a separate line that tracks a number of risks identified for each of the high level of litigation risk, the medium level of litigation risk, and the low level of litigation risk over a time period.

15. A computer-implemented method performed by at least one computing device including a processor and a memory, the method comprising:
monitoring electronic correspondence over a network to identify an electronic correspondence transmitted;
inputting, into a memory, a target electronic correspondence that has been classified as being litigious by a machine learning classifier;
identifying a first group of keywords from a library of keywords, wherein the first group of keywords indicate a high level of litigation risk;
identifying a second group of keywords from the library of keywords, wherein the second group of keywords indicate a medium level of litigation risk;
accessing the memory and analyze text from the target electronic correspondence to determine a presence of terms that correspond to one or more of the first group of keywords or the second group of keywords;
when the presence of terms is found, generating an indication on a display screen that the target electronic correspondence is labeled as the high level of litigation risk or the medium level of litigation risk;
when the presence of terms is not found:
  (i) searching the text of the target electronic correspondence for remaining keywords that have a match in the library of keywords;
  (ii) generating a litigious score based on a sum of term frequencies-inverse document frequencies using the remaining keywords; and
  (iii) based on the litigious score as compared to a threshold, generating a label for the target electronic correspondence that indicates a level of litigation risk;
transmitting an electronic notice to a remote computer over a communication network that identifies the target electronic correspondence and the level of litigation risk.

16. The method of claim 15, further comprising:
performing a first rule that searches the text of the target electronic correspondence for one or more of the first group of keywords that represent the high level of litigious risk;
in response to the one or more of the first group of keywords being found in the text, labelling the target electronic correspondence as the high level of litigation risk;
in response to the one or more of the first group of keywords not being found in the text:
   (i) performing a second rule that searches the text of the target electronic correspondence for the one or more of the second group of keywords that represent the medium level of litigation risk;
   (ii) in response to the one or more of the second group of keywords being found in the text, labelling the target electronic correspondence as the medium level of litigation.

17. The method of claim 15, wherein generating the label for the target electronic correspondence with the level of litigation risk based on the litigious score further comprises:
labelling the target electronic correspondence as the high level of litigation risk when the litigious score is above the threshold;
labelling the target electronic correspondence as the medium level of litigation risk when the litigious score is between a range of values up to the threshold; and
labelling the target electronic correspondence as a low level of litigation risk when the litigious score is below the range of values.

18. The method of claim 15, further comprising:
generating the electronic notice to include identification of the target electronic correspondence, the level of ligation risk, and one or more of the keywords found in the text that match the first group of keywords or the second group of keywords;
generating a dashboard as part of a graphical user interface configured to display a list of electronic correspondences that have been identified and labeled with the level of litigation risk from received electronic notices; and
wherein transmitting the electronic notice includes transmitting the electronic notice to the dashboard of the graphical user interface that causes information from the electronic notice to be displayed on the dashboard.

19. The method of claim 15, further comprising:
transmitting the electronic notice to the remote computer and cause a dashboard of a graphical user interface to display identification of the target electronic correspondence, the level of ligation risk, and one or more of the keywords found in the text.

20. The method of claim 15, further comprising:
generating a dashboard on a graphical user interface that includes a line graph representing a separate line that tracks a number of risks identified for each of the high level of litigation risk, the medium level of litigation risk, and the low level of litigation risk over a time period.

* * * * *